Aug. 19, 1924.
E. H. BELDEN
1,505,529
WINDSHIELD AND TOP SUPPORT
Filed Sept. 25, 1920    2 Sheets-Sheet 1
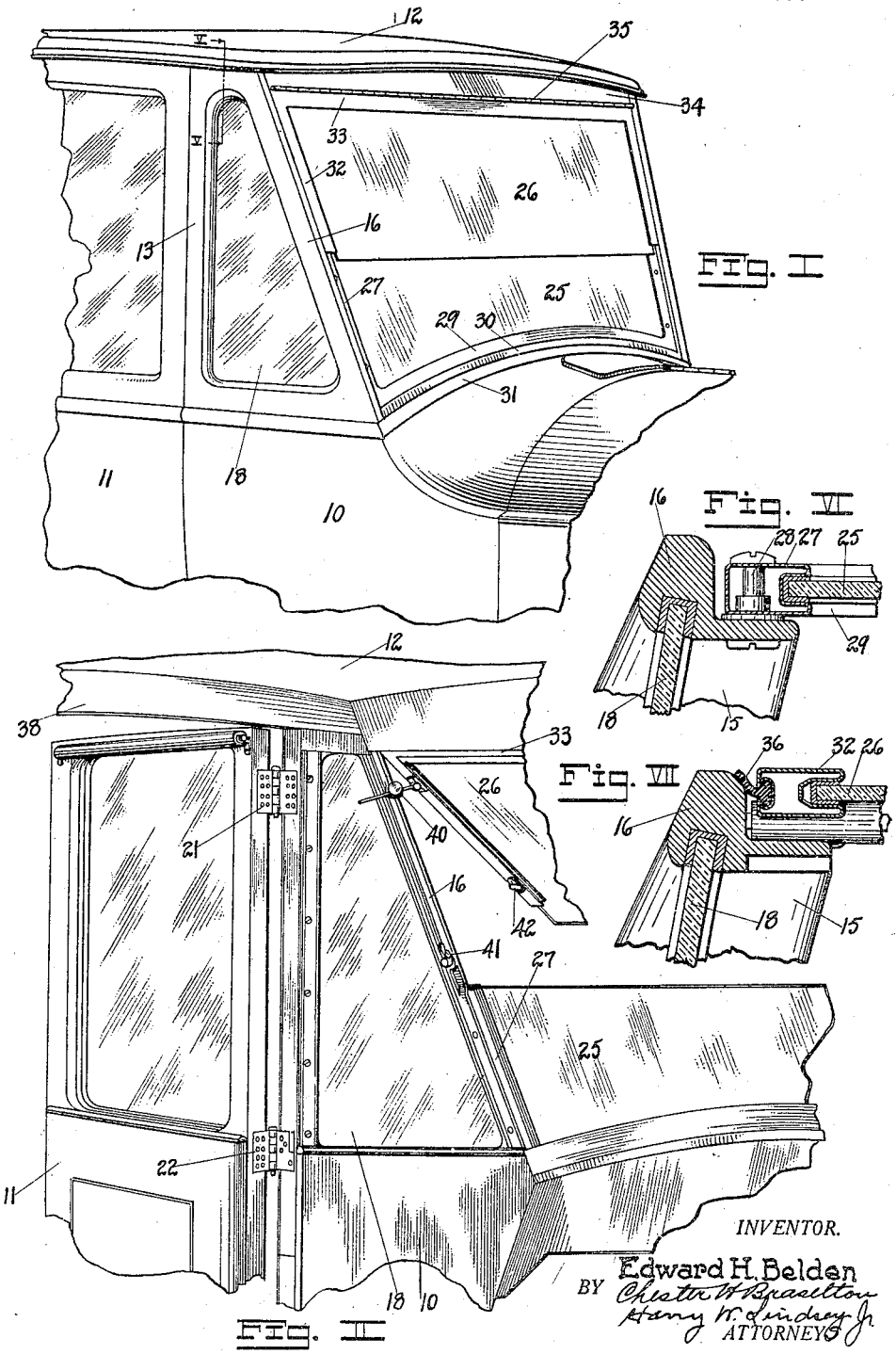
INVENTOR.
Edward H. Belden
BY Chester W Braselton
Henry W Lindsey Jr
ATTORNEYS

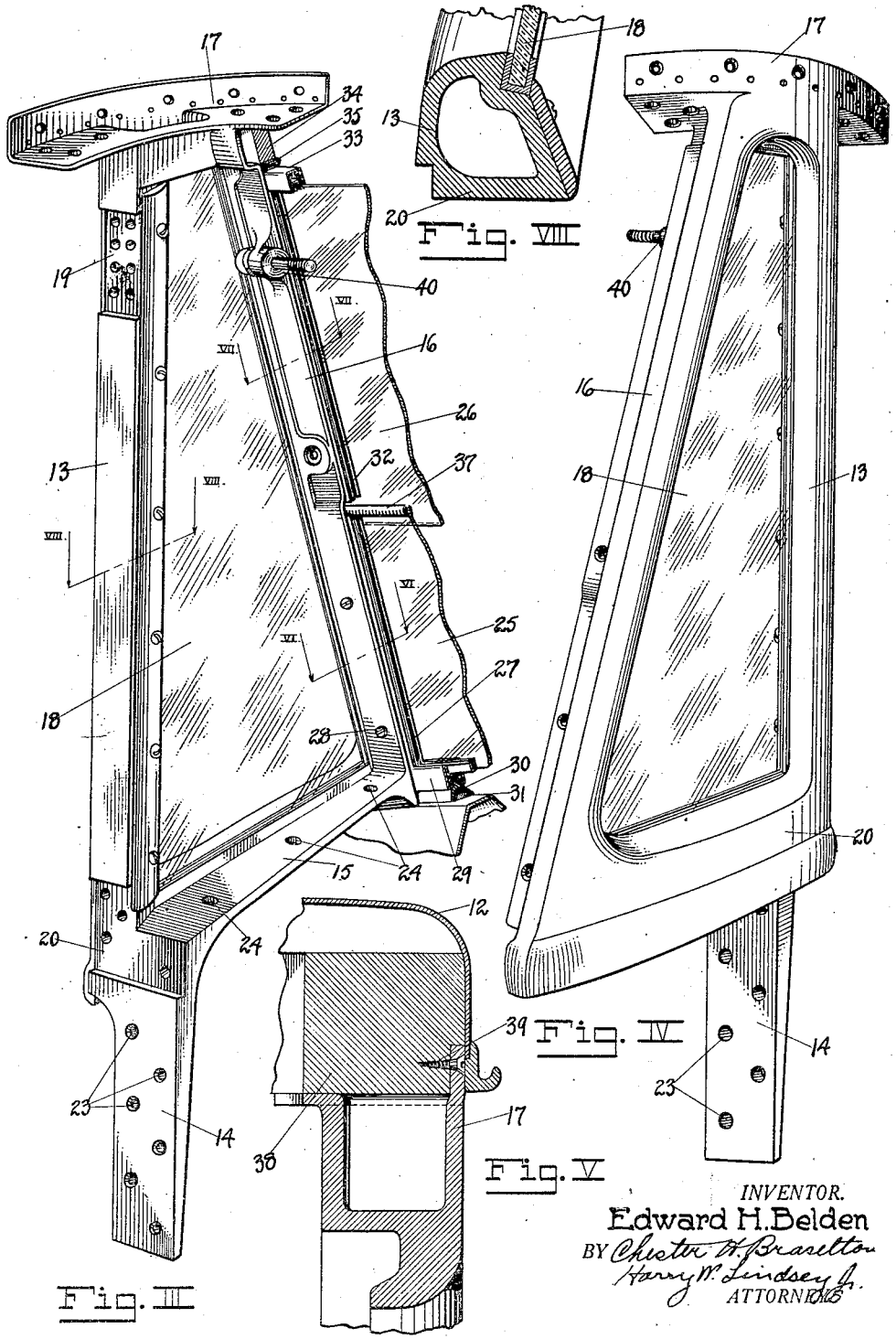

Patented Aug. 19, 1924.

1,505,529

UNITED STATES PATENT OFFICE.

EDWARD H. BELDEN, OF TOLEDO, OHIO, ASSIGNOR TO THE WILLYS-OVERLAND COMPANY, OF TOLEDO, OHIO, A CORPORATION OF OHIO.

WINDSHIELD AND TOP SUPPORT.

Application filed September 25, 1920. Serial No. 412,731.

*To all whom it may concern:*

Be it known that I, EDWARD H. BELDEN, residing at Toledo, in the county of Lucas and State of Ohio, have invented certain new and useful Improvements in Windshield and Top Supports, of which I declare the following to be a full, clear, and exact description.

This invention relates to improvements in combined windshield and top supports for automobiles of the closed top type.

One of the objects of the invention is the utilization of the front supports for the automobile top as side posts for the windshield.

Another object of the invention is the provision of a combined top and windshield support of triangular form which is preferably made integral and provided with integral means for anchorage in the automobile body.

Another object is the further utilization of this frame as the upper part of the forward door post.

Other objects, and objects relating to details of construction and economies of manufacture, will appear as I proceed with the description of that embodiment of the invention which, for the purposes of the present application, I have illustrated in the accompanying drawings, in which:

Figure I is a perspective view of a portion of an automobile embodying my invention.

Figure II is a perspective view showing a portion of the interior of an automobile.

Figure III is a detail, perspective view showing the windshield and top support with fragments of the windshield in position.

Figure IV is a perspective view of the exterior of the support.

Figure V is a detail, sectional view through the upper portion of the support and the automobile top, the section being taken approximately on the line V—V of Figure I.

Figure VI is a cross section through the lower part of the windshield side post, the section being taken approximately on the line VI—VI of Figure III.

Figure VII is a cross section through the upper part of the windshield side post, the section being taken on the line VII—VII of Figure III.

Figure VIII is a cross section of the vertical member of the support, which constitutes the door post, the section being taken substantially on the line VIII—VIII of Figure III.

Like reference characters refer to similar parts throughout the several views.

In the drawings, 10 indicates the body of an automobile having front doors 11 and a top 12.

The present invention has to do with triangular panels at the forward upper part of the sides of the body. These panels consist primarily of rear vertical elements 13 including depending elements 14, lower horizontal elements 15, inclined forward elements 16 and top supporting ledges 17. These parts are all preferably integral, and preferably are cast of a light metal such as an aluminum alloy. The substantially triangular space inclosed by the elements 13, 15 and 16 is filled with a pane of glass 18 which may be held in place by any desirable means.

The vertical elements 13 and 14 together constitute the major portions of the forward door posts, and to this end are provided with recesses 19 and 20 for the reception of hinges 21 and 22. The depending elements 14 contain perforations 23 for the reception of screws that extend through the perforations into the framework of the automobile body, thereby firmly anchoring the panel to the body. Further perforations 24 are formed in the horizontal elements 15 through which screws are driven to assist in holding the panel in place.

The inclined element 16 is rabbeted as shown clearly in Figures VI and VII, to receive the ends of the windshield panels 25 and 26. The lower portion of the rabbet is deeper than the upper portion in order that the lower panel 25 may lie in a plane behind that of the upper panel which overhangs the lower one. The lower panel is permanently mounted in the side post. The preferred means of accomplishing this mounting is illustrated in the drawing, where the side edges of the glass are shown incased in a metal frame member 27. Screw bolts 28 extend through registering holes in the member 27 and the side post 16 and by this means the lower panel is held securely in place. The bottom edge of the glass may be inclosed in an H-shaped metal binding 29 in the lower groove of which is gripped a soft rubber weatherstrip 30 which bears upon the upper part of the automobile cowl and is preferably bifurcated to straddle a bead 31 upon the cowl.

The glass of the upper panel 26 is provided with a metal binding having side members 32 and a top member 33. This panel is mounted to swing outwardly at the bottom, the top binding member 33 being attached to the front top rail 34 by means of a hinge or hinges. For this purpose I prefer to employ a continuous hinge 35, similar to a piano hinge, extending entirely across the panel. The side members 32 are formed with dove-tail grooves in the outer edges within which grooves are mounted weatherstrips 36 adapted to bear upon the side posts 16 as shown in Figure VII for the purpose of excluding wind and rain from the interior of the automobile, and also for the purpose of preventing rattling.

The upper edge of the glass in the lower panel 25 is inclosed in a rubber binding 37 which forms a stop and support for the glass of the upper panel when the latter is in closed position as illustrated in Figure III.

Each of the ledges 17 supports the forward end of one of the top supporting side rails 38 and also one end of the transverse top supporting rail 34. Each ledge includes a flat horizontal portion upon which the rails rest, and a vertical rim. Both of these portions are perforated for screws such as 39 in Figure V, by means of which the rails may be held against movement with respect to the ledges 17.

In Figure II the upper windshield panel is shown in partly open position and a means 40 is there shown for holding the panel in this or other positions of adjustment. There is also illustrated in this figure a fastening composed of two parts 41 and 42, by means of which the panel is locked in closed position, but as these features do not form any part of my present invention, they are not herein illustrated or described in detail.

While I have described my invention more or less in detail, I do not desire to be limited to specific forms, as on the contrary my invention contemplates broadly all proper changes in form, construction and arrangement of parts, as well as the omission of any material element or the substitution of equivalents, that circumstances may suggest or necessity render expedient.

What I claim as new and desire to secure by Letters Patent, is:

1. In an automobile, a body having forward door openings, supports mounted upon the body in front of said openings, said supports comprising triangular frames consisting of vertical, horizontal and inclined members, ledges on the tops of said frames adapted to support the longitudinal rails and the forward transverse rail of an automobile top, all of said members comprising each frame, together with the corresponding ledge, being formed of an integral piece of metal.

2. In an automobile, a body having forward door openings, supports mounted upon the body in front of said openings, said supports comprising triangular frames consisting of vertical, horizontal and inclined members, ledges on the tops of said frames adapted to support the longitudinal rails and the forward transverse rail of an automobile top, said inclined members constituting the side elements of a wind shield frame, all of said members of each frame, together with the corresponding ledge, being formed of an integral piece of metal.

3. In an automobile, a body having forward door openings, supports mounted upon the body in front of said openings, said supports comprising triangular frames consisting of vertical, horizontal and inclined members, ledges on the tops of said frames adapted to support the longitudinal rails and the forward transverse rail of an automobile top, and a downward extension of each of said vertical members adapted to be anchored in the automobile body, all of said members of each frame, together with the corresponding ledge and extension, being formed of an integral piece of metal.

4. In an automobile, a body having forward door openings, supports mounted upon the body in front of said openings, said supports comprising triangular frames consisting of vertical, horizontal and inclined members, ledges on the tops of said frames adapted to support the longitudinal rails and the forward transverse rail of an automobile top, said inclined members constituting the side elements of a windshield frame, a downward extension of each of said vertical members adapted to be anchored in the automobile body, all of said members of each frame, together with the corresponding ledge and extension, being formed of an integral piece of metal.

5. In an automobile, a body having forward door openings, supports mounted upon the body in front of said openings, said supports comprising triangular frames consisting of vertical, horizontal and inclined members, ledges on the tops of said frames adapted to support the longitudinal rails and the forward transverse rail of an automobile top, each of said vertical members constituting a door post, said inclined members constituting side elements of a windshield frame, and all of said members of each frame, together with the corresponding ledge, being formed of an integral piece of metal.

6. In an automobile, a body having forward door openings, supports mounted upon the body in front of said openings, said supports comprising triangular frames consisting of vertical, horizontal and inclined members, ledges on the tops of said frames adapted to support the longitudinal rails and the forward transverse rail of an automobile top, a downward extension of each of said vertical members adapted to be anchored in the automobile body, each of said vertical members constituting a door post, said inclined members constituting the side elements of a windshield frame, all of said members of each frame, together with the corresponding ledge and extension, being formed of an integral piece of metal.

In testimony whereof, I affix my signature.

EDWARD H. BELDEN.